United States Patent
Itokawa

(10) Patent No.: US 8,139,151 B2
(45) Date of Patent: Mar. 20, 2012

(54) MOVING IMAGE PROCESSING APPARATUS, CONTROL METHOD THEREOF, AND PROGRAM

(75) Inventor: Osamu Itokawa, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 12/409,125

(22) Filed: Mar. 23, 2009

(65) Prior Publication Data

US 2009/0256957 A1 Oct. 15, 2009

(30) Foreign Application Priority Data

Apr. 11, 2008 (JP) .................................. 2008-104029

(51) Int. Cl.
*H04N 7/01* (2006.01)
(52) U.S. Cl. ........................................ 348/441; 348/452
(58) Field of Classification Search .................. 348/441, 348/458, 459, 451, 452, 448, 446; *H04N 7/01, H04N 11/20*
See application file for complete search history.

(56) References Cited

U.S. PATENT DOCUMENTS

| | | | | |
|---|---|---|---|---|
| 6,236,806 | B1 * | 5/2001 | Kojima et al. | 348/441 |
| 6,477,317 | B1 | 11/2002 | Itokawa | 386/95 |
| 2004/0114048 | A1 * | 6/2004 | Jung et al. | 348/441 |
| 2009/0086093 | A1 * | 4/2009 | Wei | 348/451 |

FOREIGN PATENT DOCUMENTS

| | | |
|---|---|---|
| JP | 7-107375 | 4/1995 |
| JP | 11-88845 | 3/1999 |

* cited by examiner

*Primary Examiner* — Sherrie Hsia
(74) *Attorney, Agent, or Firm* — Fitzpatrick, Cella, Harper & Scinto

(57) ABSTRACT

A frame image is generated by combining a current field image and a preceding field image as a first candidate image. A frame image is generated by combining the current field image and a succeeding field image as a second candidate image. A frame image is generated by pixel interpolation processing for the current field image and output as a third candidate image. It is determined whether the current field image has continuity to the preceding or succeeding field image, or no continuity with any of them. Based on the determination result, the determination result of the current field image is stored as log information. A specific pattern is detected from the pattern of stored log information of continuous field images before the current field image. One of the first to third candidate images is selected as the frame image of the current field image based on the detection result.

9 Claims, 10 Drawing Sheets

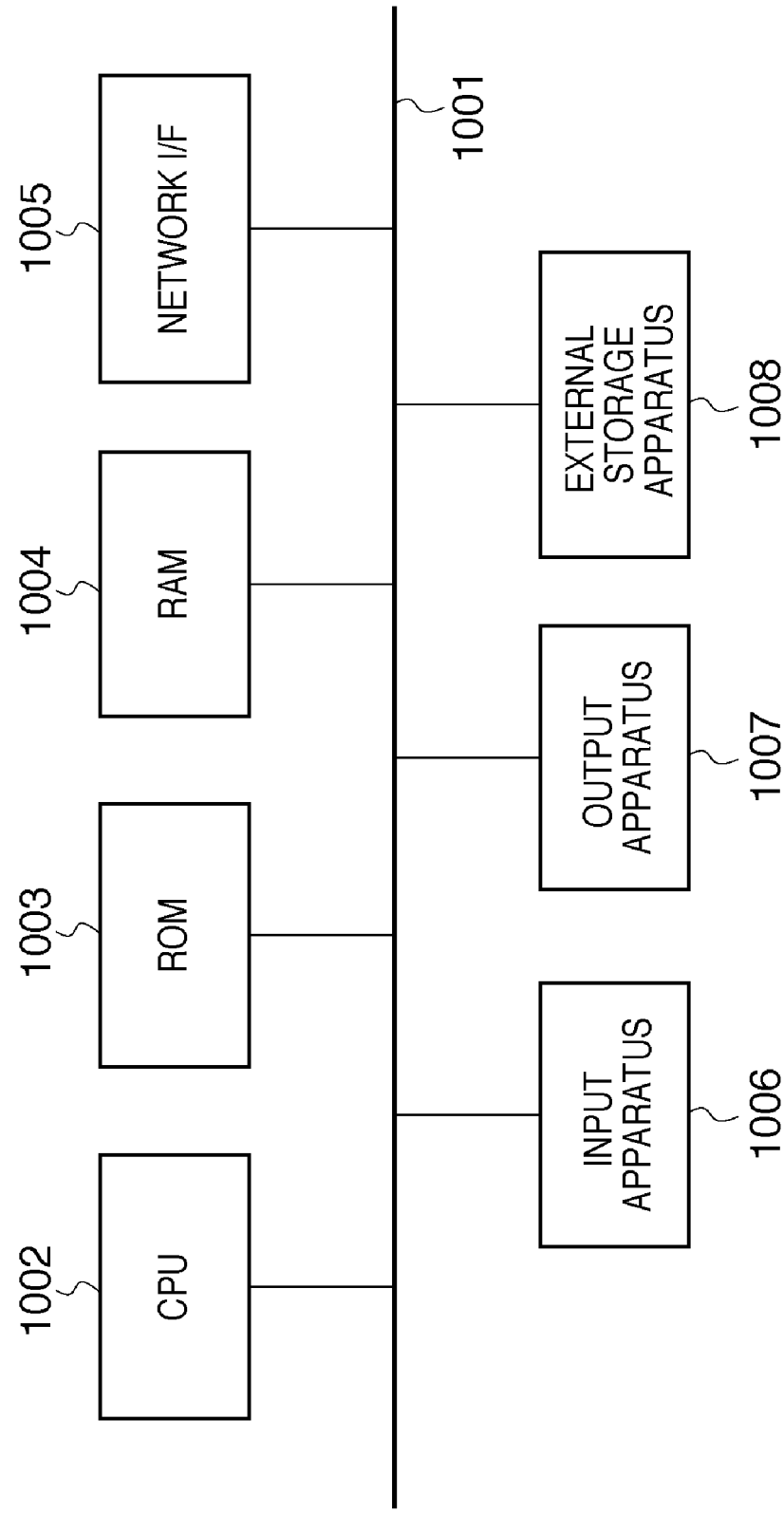

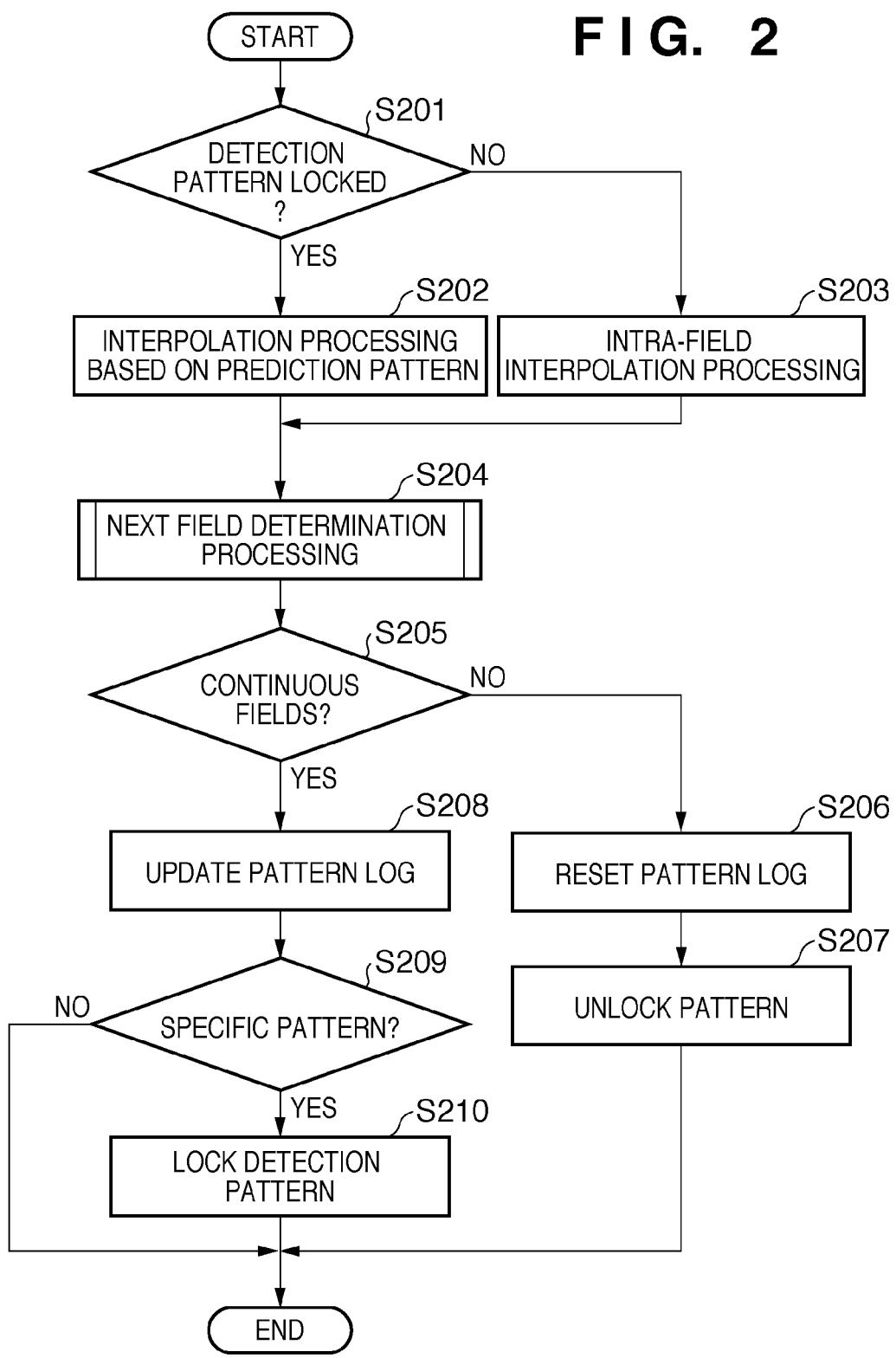

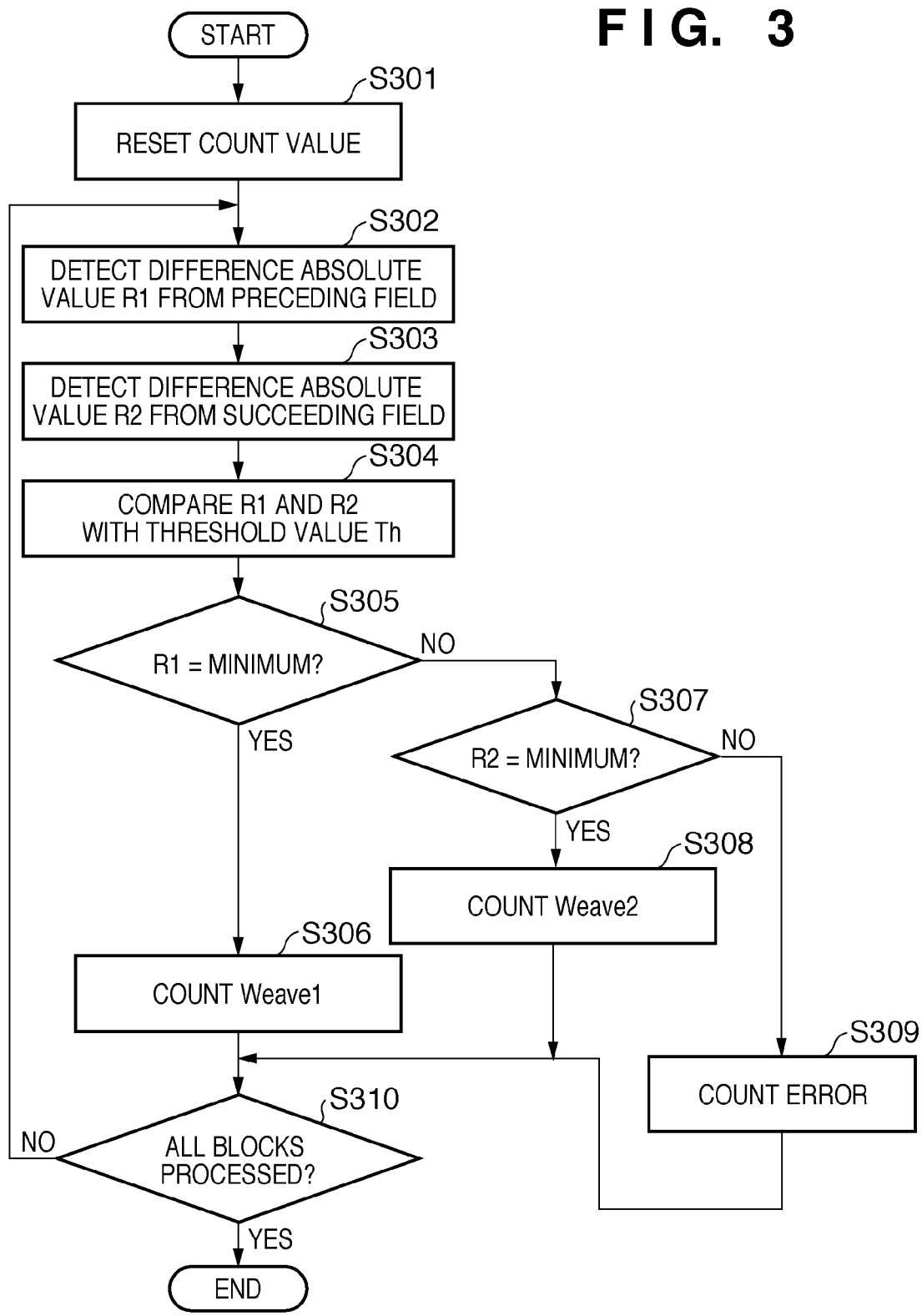

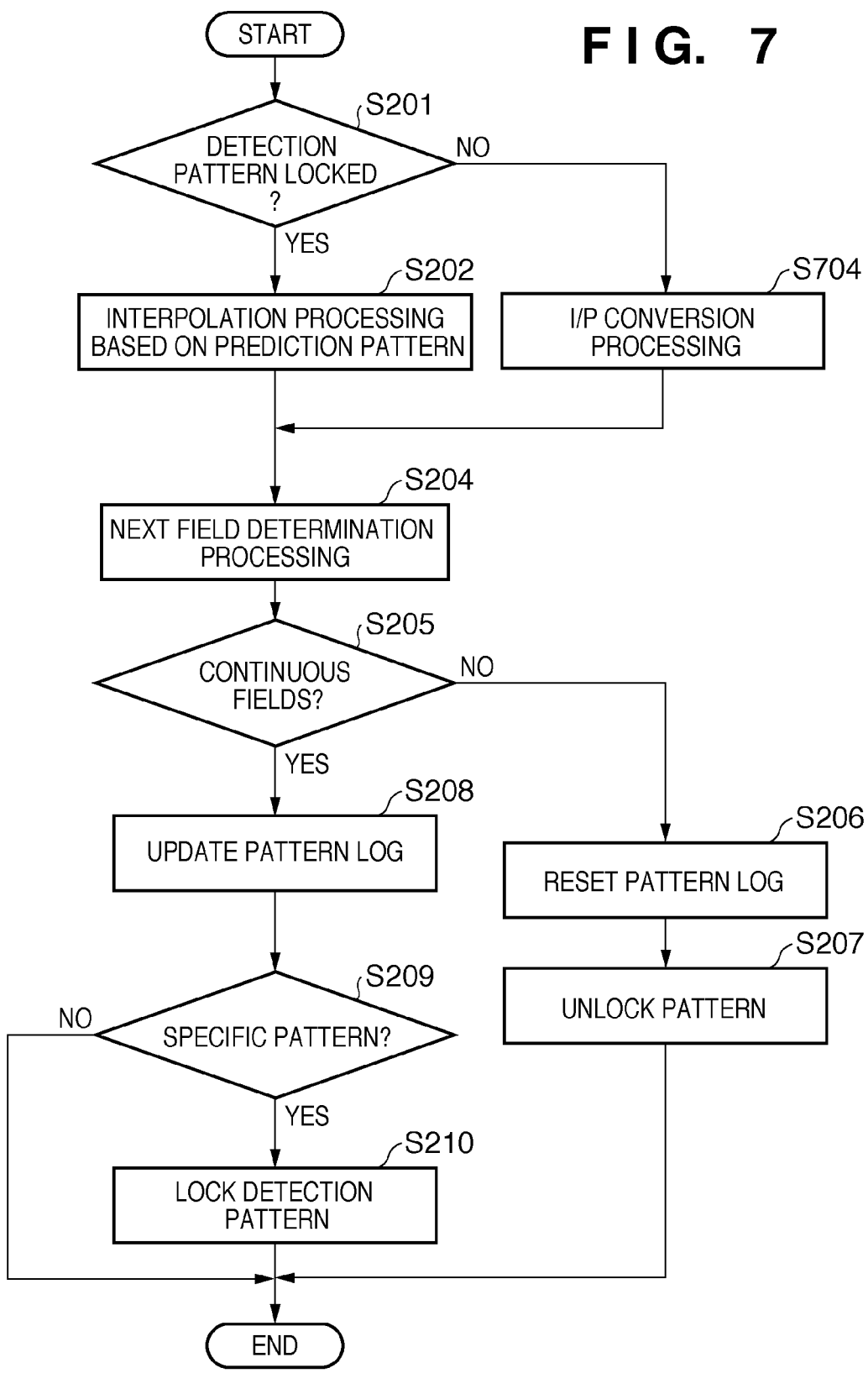

MOVING IMAGE PROCESSING APPARATUS, CONTROL METHOD THEREOF, AND PROGRAM

BACKGROUND OF THE INVENTION

1. Field of the Invention

The present invention relates to a moving image processing apparatus for generating a frame image from a field image in a moving image, a control method thereof, and a program.

2. Description of the Related Art

To transmit and store moving image data, conventionally, an interlaced image (field image) with 60 fields per second is widely used. For transmission of digital broadcasting or digital data storage of DVDs, an interlaced image is compressed using moving image encoding based on MPEG-2. Even shooting by a video camera is generally done using an interlaced image with 60 fields per second.

On the other hand, movie shooting and screening commonly use an image of 24 frames per sec. Hence, recording on a DVD is done normally by converting a progressive image (frame image) having 24 frames per sec into an interlaced image (field image) having 60 fields per sec.

This conversion is called 2-3 pull-down processing in general. FIG. 9A shows frame images A to D at a rate of 24 frames per sec. FIG. 9B shows an interlaced image including 60 fields per sec. The 2-3 pull-down processing divides the continuous frame images A to D into 2-3-2-3 field images A1, A2, B1, B2, B3, C1, C2, D1, D2, and D3. Odd- and even-numbered field images are converted into the field images of an interlaced image in an alternating sequence.

A display for displaying these broadcasting or stored images uses a CRT from long ago. The CRT directly outputs and displays an input interlaced image. However, recent development of new display devices represented by LCDs and plasma displays is popularizing apparatuses for displaying a progressive image converted from an interlaced image.

To convert an interlaced image (field image) into a progressive image (frame image), a current field image and an immediately preceding field image are simply combined to generate a frame image (e.g., Japanese Patent Laid-Open No. 11-88845).

FIG. 9C shows an example of frame image generation using this method. A1/A2 indicates a frame image generated by combining the field images A1 and A2. The field images A1 and A2 are generated from a frame image of the same time. Hence, they can theoretically completely reproduce the original frame image. In this method, however, the next frame image A2/B1 is generated from field images of different times and is therefore visually unnatural.

If it is known that the frame images are initially generated at a rate of 24 frames per sec, and the field images undergo the 2-3 pull-down processing, the initial frame images can be reconstructed by executing processing inverse to the 2-3 pull-down processing. When two frames and three frames of these frame images are reproduced in an alternating sequence, no frame image is generated by combining field images of different times.

FIG. 9D shows the inverse 2-3 pull-down processing. The field image A1 is combined with the immediately succeeding field image A2 to generate the frame image A1/A2. The field image A2 is combined with the immediately preceding field image A1 to generate the frame image A1/A2. The field image B1 is combined with the immediately succeeding field image B2 to generate the frame image B1/B2. The field image B2 is combined with the immediately preceding field image B1 to generate the frame image B1/B2. The field image B3 is combined with the immediately preceding field image B2 to generate the frame image B2/B3.

That is, to generate a frame image by combining field images of the same time, a target field image is combined with an immediately preceding or immediately succeeding field image. Combination with an immediately succeeding field image is represented by "2". Combination with an immediately preceding field image is represented by "1". The field image combination pattern is 2-1-2-1-1. Generated frame images have the repetitive pattern of the combination pattern.

Japanese Patent Laid-Open No. 7-107375 discloses an example of a repetitive pattern detection method. The technique of Japanese Patent Laid-Open No. 7-107375 returns an interlaced image at a rate of 60 fields per sec to a progressive image at a rate of 24 frames per sec. The repetitive pattern detection technique is common to that in processing of generating a progressive image at a rate of 60 frames per sec. This method detects the difference between field images to determine whether they are generated from a frame image of the same time. The repetitive pattern of the sets of field images of the same time is detected based on the determination result. Frame images can be generated and displayed in a correct time sequence without any problem as long as the repetitive pattern is detected.

However, an image generated by the 2-3 pull-down processing does not always take the 2-1-2-1-1 repetitive pattern described above. The repetitive pattern may be disordered if, for example, field images that have undergone the 2-3 pull-down processing are edited at an arbitrary point. FIG. 9E shows an example in which the scene after the field image B2 in FIG. 9B is cut, and a scene from a field image M1 is connected.

In this case, an ideal repetitive pattern from the field image A1 is 2-1-2-1-2-1-2-1-1. Japanese Patent Laid-Open No. 7-107375 employs a method of correcting such a phase shift in the repetitive pattern by externally giving the information of the editing point, but mentions no specific resolution to how to detect the editing point.

FIG. 9F shows an example in which the scene after the field image B2 in FIG. 9B is cut, and a scene from a field image L3 is connected. In this case, there is no ideal field image combination for the field image L3. The field image L3 degrades the image quality when combined with either the field image B2 or the field image M1.

SUMMARY OF THE INVENTION

The present invention has been made to solve the above-described problems, and the present invention provides to provide a moving image processing apparatus capable of preventing generation of a frame image degraded due to a change of the time axis and maintaining stable image quality even when the periodicity of the field image sequence is disordered, a control method thereof, and a program.

According to the first aspect of the present invention, a moving image processing apparatus for generating a frame image from a field image in a moving image, comprises: a first candidate image generation unit adapted to receive a current field image of current time and a preceding field image chronologically immediately before the current field image, generate a frame image by combining the current field image and the preceding field image as data of the same time, and output the frame image as a first candidate image; a second candidate image generation unit adapted to receive the current field image of the current time and a succeeding field image chronologically immediately after the current field image, generate a frame image by combining the current field image and the succeeding field image as data of the same time, and output the frame image as a second candidate image; a third candidate image generation unit adapted to receive the current field image, generate a frame image by pixel interpolation processing for the current field image, and output the frame image as a third candidate image; a determination unit adapted to determine whether the current field image has continuity to the preceding field image or continuity to the succeeding field image, or no continuity with any of the preceding field image and the succeeding field image; a storage unit adapted to store, based on a determination result of the determination unit, the determination result of the current field image as log information; a detection unit adapted to detect a specific pattern from a pattern of log information of continuous field images before the current field image, the log information being stored in the storage unit; and a selection unit adapted to select one of the first candidate image, the second candidate image, and the third candidate image as a frame image of the current field image based on a detection result of the detection unit.

In one embodiment, if the detection unit detects the specific pattern, the selection unit selects one of the first candidate image and the second candidate image as the frame image of the current field image in accordance with the specific pattern, and if the detection unit does not detect the specific pattern, the selection unit selects the third candidate image as the frame image of the current field image.

In one embodiment, the determination unit determines whether the current field image has continuity to the preceding field image or continuity to the succeeding field image, or no continuity with any of the preceding field image and the succeeding field image, based on a magnitude relationship between three values including a correlation value between the preceding field image and the current field image, a correlation value between the current field image and the succeeding field image, and a threshold value.

In one embodiment, if the determination result represents that the current field image has continuity to one of the preceding field image and the succeeding field image, the storage unit stores log information of the determination result and updates the log information stored so far, and if the determination result represents that the current field image has no continuity to any of the preceding field image and the succeeding field image, the storage unit resets the log information stored so far.

In one embodiment, the third candidate image generation unit receives one of the preceding field image and the succeeding field image as an interpolated pixel generation field image, and generates, for each pixel, an interpolated pixel using pixels in the current field image and those in the interpolated pixel generation field image in accordance with a designated weight, thereby generating a frame image corresponding to the current field image.

In one embodiment, the third candidate image generation unit changes the weight in accordance with presence/absence of detection of the specific pattern by the detection unit.

In one embodiment, if the detection unit does not detect the specific pattern, the third candidate image generation unit increases the weight of use of the pixels in the current field image.

According to the second aspect of the present invention, a control method of a moving image processing apparatus for generating a frame image from a field image in a moving image, comprises: a first candidate image generation step of receiving a current field image of current time and a preceding field image chronologically immediately before the current field image, generating a frame image by combining the current field image and the preceding field image as data of the same time, and outputting the frame image as a first candidate image; a second candidate image generation step of receiving the current field image of the current time and a succeeding field image chronologically immediately after the current field image, generating a frame image by combining the current field image and the succeeding field image as data of the same time, and outputting the frame image as a second candidate image; a third candidate image generation step of receiving the current field image, generating a frame image by pixel interpolation processing for the current field image, and outputting the frame image as a third candidate image; a determination step of determining whether the current field image has continuity to the preceding field image or continuity to the succeeding field image, or no continuity with any of the preceding field image and the succeeding field image; a storage step of storing, in a storage medium based on a determination result in the determination step, the determination result of the current field image as log information; a detection step of detecting a specific pattern from a pattern of log information of continuous field images before the current field image, the log information being stored in the storage medium; and a selection step of selecting one of the first candidate image, the second candidate image, and the third candidate image as a frame image of the current field image based on a detection result in the detection step.

According to the third aspect of the present invention, a program stored in a computer-readable storage medium to cause a computer to control a moving image processing apparatus for generating a frame image from a field image in a moving image, causes the computer to execute: a first candidate image generation step of receiving a current field image of current time and a preceding field image chronologically immediately before the current field image, generating a frame image by combining the current field image and the preceding field image as data of the same time, and outputting the frame image as a first candidate image; a second candidate image generation step of receiving the current field image of the current time and a succeeding field image chronologically immediately after the current field image, generating a frame image by combining the current field image and the succeeding field image as data of the same time, and outputting the frame image as a second candidate image; a third candidate image generation step of receiving the current field image, generating a frame image by pixel interpolation processing for the current field image, and outputting the frame image as a third candidate image; a determination step of determining whether the current field image has continuity to the preceding field image or continuity to the succeeding field image, or no continuity with any of the preceding field image and the succeeding field image; a storage step of storing, in a storage medium based on a determination result in the determination step, the determination result of the current field image as log information; a detection step of detecting a specific pattern from a pattern of log information of continuous field images before the current field image, the log information being stored in the storage medium; and a selection step of selecting one of the first candidate image, the second candidate image, and the third candidate image as a frame image of the current field image based on a detection result in the detection step.

Further features of the present invention will become apparent from the following description of exemplary embodiments with reference to the attached drawings.

BRIEF DESCRIPTION OF THE DRAWINGS

FIG. 1B is a block diagram showing the hardware configuration of the moving image processing apparatus according to the first embodiment of the present invention;

FIG. 2 is a flowchart illustrating processing to be executed by the moving image processing apparatus according to the first embodiment of the present invention;

FIG. 3 is a flowchart illustrating details of next field determination processing according to the first embodiment of the present invention;

FIG. 7 is a flowchart illustrating processing to be executed by the moving image processing apparatus according to the second embodiment of the present invention;

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

The embodiments of the present invention will now be described in detail with reference to the accompanying drawings.

The present invention is directed to moving image processing of converting, e.g., an interlaced image at a rate of 60 fields per sec of a moving image into a progressive image at a rate of 60 frames per sec. The present invention is particularly directed to moving image processing when an input interlaced image is generated from a progressive image not at a frame rate of 60 frames per sec (e.g., at a frame rate of 24 frames per sec).

An object of the present invention is especially to provide a moving image processing apparatus which prevents degradation in the image quality caused by a combination of field images of different times even in a 2-3 pull-down image whose pattern is disordered upon editing, a control method thereof, and a program.

First Embodiment

Figure 1A:
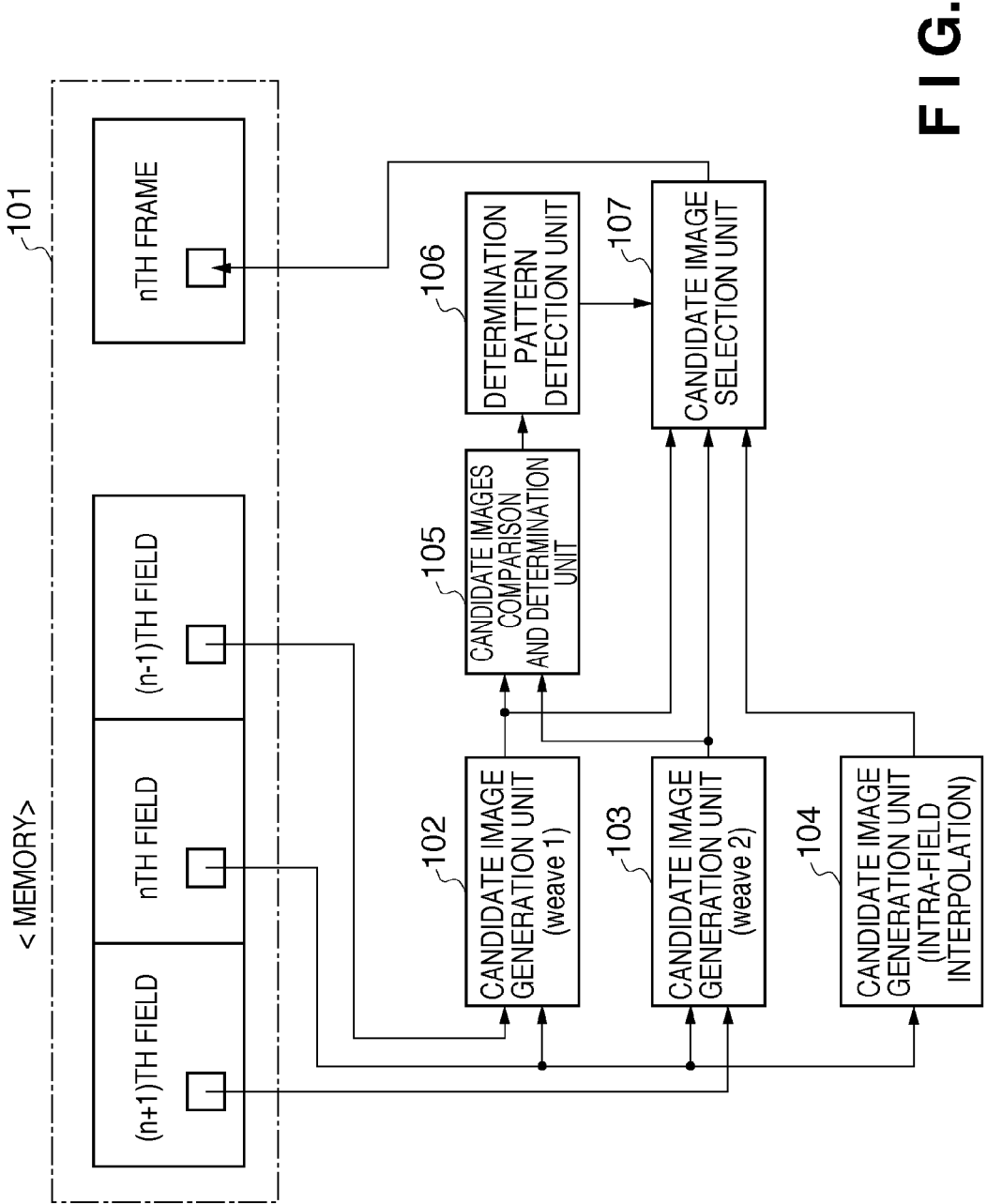
FIG. 1A is a block diagram showing the functional arrangement of a moving image processing apparatus according to the first embodiment of the present invention.

FIG. 1A is a block diagram showing the functional arrangement of a moving image processing apparatus according to the first embodiment of the present invention.

The moving image processing apparatus of the first embodiment reads out three field images simultaneously from a memory 101, processes these inputs, generates one frame image as an output, and writes it in the memory 101.

The three field images are an nth current field image, a (n−1)th field image chronologically immediately before the nth current field image, and a (n+1)th field image chronologically immediately after the nth current field image.

A first candidate image generation unit 102 combines the current field image with the immediately preceding field image as data of the same time, thereby generating a frame image (first candidate image). A second candidate image generation unit 103 combines the current field image with the immediately succeeding field image as data of the same time, thereby generating a frame image (second candidate image).

A candidate images comparison and determination unit 105 determines which field image combination of the two candidate images corresponds to a frame image of the same time. As a characteristic feature of the present invention, the determination has an additional choice "neither".

A determination pattern detection unit 106 checks the log of the determination result that is the output from the candidate images comparison and determination unit 105, and detects whether the determination result matches a determination pattern for determination in 2-3 pull-down processing.

If the detection result of the determination pattern detection unit 106 indicates matching with the determination pattern (specific pattern) of 2-3 pull-down processing, a candidate image selection unit 107 selects a frame image from a candidate image generation unit in accordance with the specific pattern and outputs it. Especially, in the first embodiment, when the determination result matches a specific pattern, the candidate image selection unit 107 selectively outputs the frame image from the candidate image generation unit 102 or that from the candidate image generation unit 103 in accordance with the specific pattern.

If the candidate images comparison and determination unit 105 determines that neither of the field image combinations of the two candidate images corresponds to a frame image of the same time, the pattern log of the determination pattern detection unit 106 is reset. The candidate image selection unit 107 selects the output from a third candidate image generation unit 104. As a characteristic feature, the candidate image generation unit 104 generates a third candidate image using intra-field interpolation processing (pixel interpolation processing) without using a field image of a different time.

In the above-described way, the candidate image selection unit 107 selects, as the frame image of the current field image, one of the first to third candidate images based on the detection result (presence/absence of a specific pattern).

A candidate image can be generated by simultaneously processing a whole field image. However, this requires an enormous circuit scale. It is therefore more practical to segment each field image into a predetermined number of blocks and obtain the result of each field image based on the accumulation of the determination results of blocks.

Various functional components of the moving image processing apparatus shown in FIG. 1A can be implemented by dedicated hardware or software. They may be implemented by cooperatively using hardware and software.

The hardware configuration of the moving image processing apparatus in FIG. 1A will be described with reference to FIG. 1B.

FIG. 1B is a block diagram showing the hardware configuration of the moving image processing apparatus according to the first embodiment of the present invention.

A CPU 1002 controls various constituent elements of the moving image processing apparatus. A ROM 1003 stores various kinds of programs to implement processing (processing corresponding to flowcharts to be described later) to be executed by the moving image processing apparatus, and various kinds of data such as parameters. The CPU 1002 executes necessary processing by reading out a program from the ROM 1003 and executing it.

A RAM 1004 functions as a work area and a temporary save area of data. The memory 101 in FIG. 1A is implemented by, e.g., the RAM 1004. A network interface (I/F) 1005 is connected to a network to transmit/receive data to/from an external device on the network.

An input apparatus 1006 including a keyboard and a pointing device (mouse) is used to execute various kinds of processing and input data such as parameters in the moving image processing apparatus. An output apparatus 1007 is a display apparatus such as an LCD and provides a graphic user interface such as an operation window to execute various kinds of processing or a window to display a processing result. Besides the display apparatus, a printing apparatus can be provided as the output apparatus 1007.

An external storage apparatus 1008 stores a moving image file (a series of field images) to be processed or a processed moving image file (a series of frame images), or various kinds of data.

Detailed processing of the moving image processing apparatus according to the first embodiment will be described next with reference to FIGS. 2 to 4.

FIG. 2 is a flowchart illustrating processing to be executed by the moving image processing apparatus according to the first embodiment of the present invention.

First, the candidate images comparison and determination unit 105 determines whether the detection pattern is locked (fixed) (step S201). In a normal state, the detection pattern is locked. If the detection pattern is locked (YES in step S201), the candidate image selection unit 107 selects the candidate image generation unit 102 or 103 in accordance with the detection pattern. The selected candidate image generation unit 102 or 103 generates a frame image by interpolation processing based on the prediction pattern (locked detection pattern) (step S202).

If the detection pattern is disordered by, e.g., editing (the detection pattern is not locked) (NO in step S201), the detection pattern is unlocked. At this time, the candidate image selection unit 107 selects the candidate image generation unit 104. The selected candidate image generation unit 104 generates a frame image by intra-field interpolation processing (step S203). This is processing for the current field image. Preparation processing for the next field will be described below.

Next, the candidate images comparison and determination unit 105 executes next field determination processing (step S204). This processing determines whether the current field image and the next field image (the preceding field image and the succeeding field image) have continuity (whether an editing point exists), and detects the combination of field images, thereby preparing for pattern determination.

Details of the next field determination processing will be described with reference to FIGS. 3 and 4.

Figure 4:
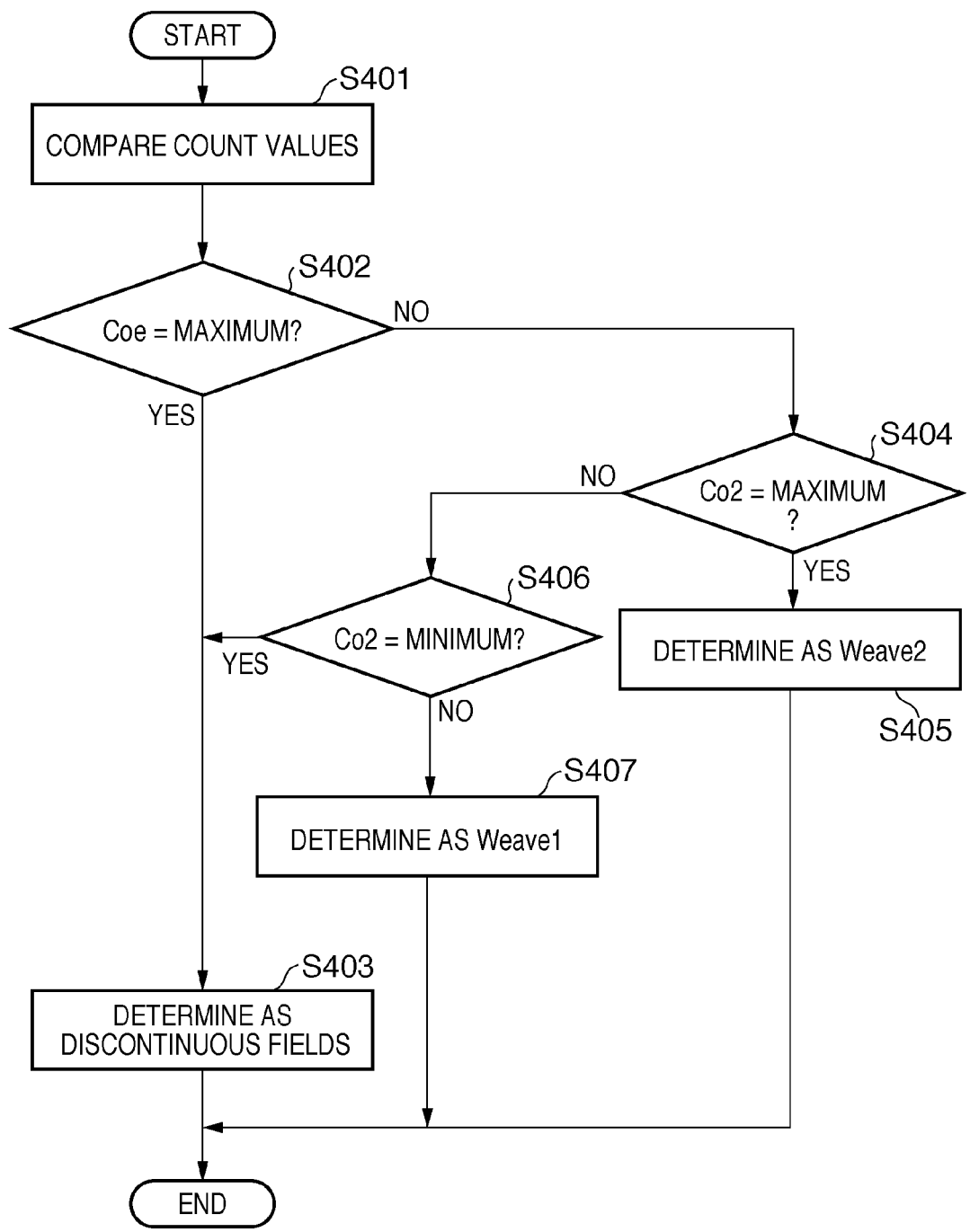
FIG. 4 is a flowchart illustrating details of next field determination processing according to the first embodiment of the present invention.

FIGS. 3 and 4 are flowcharts illustrating details of the next field determination processing according to the first embodiment of the present invention.

FIG. 3 shows the first half of the next field determination processing.

First, the candidate images comparison and determination unit 105 performs initialization by segmenting a field image into a predetermined number of blocks and resetting a count value for accumulating the processing of each block to zero (step S301). From then on, processing is executed for each block.

The candidate images comparison and determination unit 105 detects the correlation value between the preceding field image and the current field image (step S302). A difference absolute value R1 is detected as the correlation value (first correlation value). The larger the difference absolute value R1 is, the smaller the correlation between the images is. The candidate images comparison and determination unit 105 simultaneously detects the correlation value between the current field image and the succeeding field image (step S303). A difference absolute value R2 is detected as the correlation value (second correlation value).

The candidate images comparison and determination unit 105 compares the two difference absolute values R1 and R2 with a threshold value Th for error detection (step S304). If the difference absolute value of the comparison target is equal to or smaller than the threshold value Th, the correlation is determined as large. If the difference absolute value is larger than the threshold value Th, the correlation is determined as small.

If R1 is minimum (YES in step S305), the combination of the preceding field image and the current field image is supposed to be optimum (have continuity). The candidate images comparison and determination unit 105 counts this combination as Weave1 (step S306). Letting Co1 be the counter for counting Weave1, the current count value is incremented by one (Co1←Co1+1).

If R2 is minimum (NO in step S305, and then YES in step S307), the combination of the current field image and the succeeding field image is supposed to be optimum (have continuity). The candidate images comparison and determination unit 105 counts this combination as Weave2 (step S308). Letting Co2 be the counter for counting Weave2, the current count value is incremented by one (Co2←Co2+1).

If both R1 and R2 are larger than Th (NO in step S305, and then NO in step S307), the correlation is supposed to be small. The candidate images comparison and determination unit 105 counts it as an error (step S309). Letting Coe be the counter for counting an error, the current count value is incremented by one (Coe←Coe+1).

The candidate images comparison and determination unit 105 classifies each block to one of Co1 (Weave1), Co2 (Weave2), and Coe (error). This processing is repeated for all blocks (step S310).

FIG. 4 shows the second half of the next field determination processing.

After calculating the count values Co1, Co2, and Coe corresponding to one frame, the candidate images comparison and determination unit 105 compares these values (confirms the magnitude relationship) and derives a determination result (step S401).

If the count value of the counter Coe is maximum (YES in step S402), the correlation between the fields is supposed to be small. The candidate images comparison and determination unit 105 determines the target field images as discontinuous fields (step S403).

If the count value of the counter Co2 is maximum (NO in step S402, and then YES in step S404), the candidate images comparison and determination unit 105 determines the target field images as Weave2 (step S405).

If the count value of the counter Co2 is not maximum but minimum (NO in step S404, and then YES in step S406), the candidate images comparison and determination unit 105 determines the target field images as discontinuous fields (step S403).

If the count value of the counter Co2 is neither maximum nor minimum (NO in step S404, and then NO in step S406), the candidate images comparison and determination unit 105 determines the target field images as Weave1 (step S407). In this case, the count value of the counter Co1 is maximum.

These determination results are stored in, e.g., the memory 101 in the apparatus. The log (log information) of past determination results is managed in this way. In other words, a pattern corresponding to the selection order of candidate images selected for generating a frame image corresponding to field images in the past is managed.

Based on the determination results, the processing continues from step S205 in FIG. 2.

The candidate images comparison and determination unit 105 determines whether the target field images are continuous fields (step S205). If the target field images are discontinuous fields (NO in step S205), the candidate images comparison and determination unit 105 resets the pattern log (step S206). Then, the candidate images comparison and determination unit 105 unlocks the pattern (step S207).

If the target field images are continuous fields (YES in step S205), the candidate images comparison and determination unit 105 updates the pattern log (step S208).

The determination pattern detection unit 106 determines whether the updated pattern matches a specific pattern (step S209). In other words, the determination pattern detection unit 106 detects the presence/absence of a specific pattern in the updated pattern.

A specific pattern is a combination pattern 2-1-2-1-1 representing the combination of the current field image and the preceding or succeeding field image in 2-3 pull-down processing. The pattern can be 1-2-1-1-2, 2-1-1-2-1, 1-1-2-1-2, or 1-2-1-2-1 if the order does not change. If one of the specific patters matches the updated pattern (YES in step S209), the determination pattern detection unit 106 locks the detection pattern (step S210). That is, the detection pattern is usable as a prediction pattern to generate a frame corresponding to the field images.

If none of the specific patters matches the updated pattern (NO in step S209), the determination pattern detection unit 106 ends the processing.

An outline of the sequence of overall processing to be executed by the moving image processing apparatus of the first embodiment has been described above.

Figure 9A:
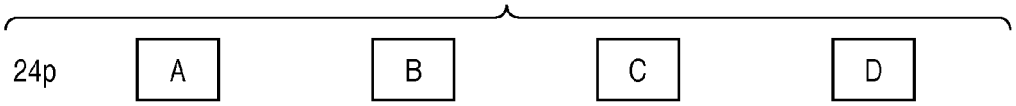
FIGS. 9A to 9F are views for explaining the relationship between frame images and field images.
Figure 9B:
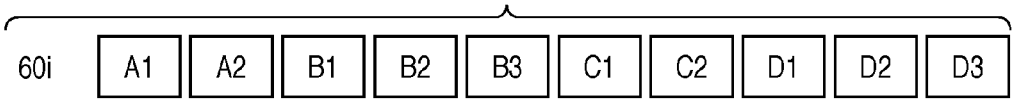
Figure 9C:
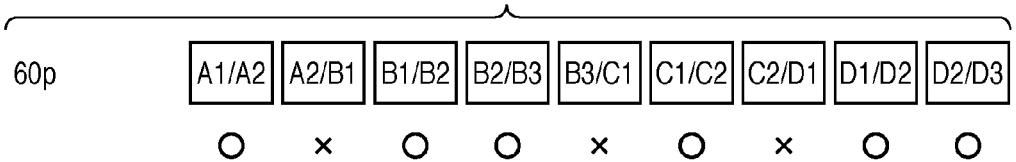
Figure 9D:
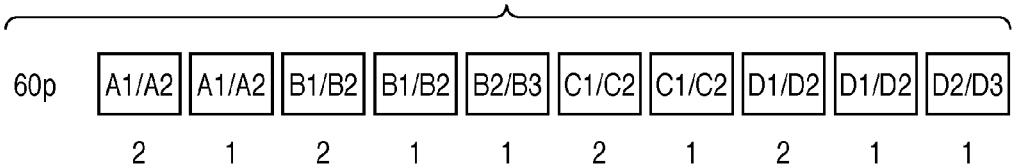
Figure 9E:
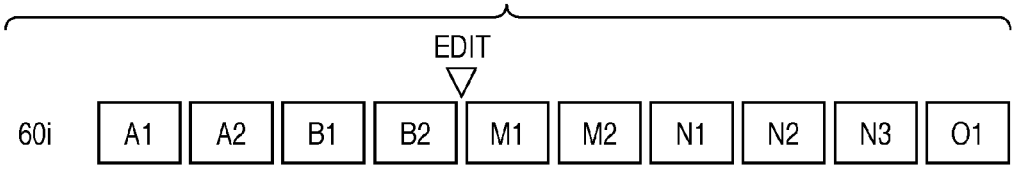

A detailed processing procedure will be described next using an example of edition shown in FIG. 9E.

In this example, an editing point exists after a field image B2. An explanation will be made assuming that a specific pattern of 2-3 pull-down processing is detected up to the field image B2.

Processing to be executed when the current field image is a field image A1 will be described. Since the detection pattern is locked (pattern is detected), interpolation processing based on a prediction pattern is performed. Since the prediction pattern corresponds to "2" at the top of 2-1-2-1-1, a frame image is output by combination with an immediately succeeding field image A2. This corresponds to selection of the output image from the candidate image generation unit 103 in FIG. 1A.

Simultaneously, next field determination processing is performed. The output from the determination processing branches to three cases: "combination with the preceding field image", "combination with the succeeding field image", and "neither".

More specifically, the result is selected from "the field image A1 is paired with the immediately preceding field image", "the field image A1 is paired with the field image A2", and "the field image A1 is paired with neither field image". In this case, Co2>Co1>Coe in the processing shown in FIGS. 3 and 4. Hence, the field images A1 and A2 are determined as continuous fields. The field image A1 is the preceding field image for the next field image A2. Hence, the pattern "1" is newly updated. If the determination results of the five fields in the past are 1-2-1-1-2, and the next is "1", the pattern matches the specific pattern (repetitive pattern) 2-1-2-1-1. Hence, the detection pattern is continuously locked.

Processing to be executed when the current field image is the field image A2 will be described next. Since the detection pattern is locked (pattern is detected), interpolation processing based on a prediction pattern is performed. Since the prediction pattern corresponds to "1" at the second place of 2-1-2-1-1, a frame image is output by combination with the immediately preceding field image A1. This corresponds to selection of the output image from the candidate image generation unit 102 in FIG. 1A.

Simultaneously, next field determination processing is performed. The output from the determination processing branches to three cases: "combination with the preceding field image", "combination with the succeeding field image", and "neither".

More specifically, the result is selected from "the field image A2 is paired with the field image A1", "the field image A2 is paired with a field image B1", and "the field image A2 is paired with neither field image". In this case, Co1>Co2>Coe in the processing shown in FIGS. 3 and 4. Hence, the field images A2 and B1 are determined as continuous fields. The next field image B1 is not paired with the preceding field image A2. The field image B1 is supposed to be paired with the succeeding field image. Hence, the pattern "2" is newly updated. If the determination results of the five fields in the past are 2-1-1-2-1, and the next is "2", the pattern matches the specific pattern (repetitive pattern) 2-1-2-1-1. Hence, the detection pattern is continuously locked.

Processing to be executed when the current field image is the field image B1 will be described next. Since the detection pattern is locked (pattern is detected), interpolation processing based on a prediction pattern is performed. Since the prediction pattern corresponds to "2" at the third place of 2-1-2-1-1, a frame image is output by combination with an immediately succeeding field image B2. This corresponds to selection of the output image from the candidate image generation unit 103 in FIG. 1A.

Simultaneously, next field determination processing is performed. The output from the determination processing branches to three cases: "combination with the preceding field image", "combination with the succeeding field image", and "neither".

More specifically, the result is selected from "the field image B1 is paired with the field image A2", "the field image B1 is paired with the field image B2", and "the field image B1 is paired with neither field image". Co2>Co1>Coe in the processing shown in FIGS. 3 and 4. Hence, the field images B1 and B2 are determined as continuous fields. The field image B1 is the preceding field image for the next field image B2. Hence, the pattern "1" is newly updated. If the determination results of the five fields in the past are 1-1-2-1-2, and the next is "1", the pattern matches the specific pattern (repetitive pattern) 2-1-2-1-1. Hence, the detection pattern is continuously locked.

Processing to be executed when the current field image is the field image B2 will be described next. Since the detection pattern is locked (pattern is detected), interpolation processing based on a prediction pattern is performed. Since the prediction pattern corresponds to "1" at the fourth place of 2-1-2-1-1, a frame image is output by combination with the immediately preceding field image B1. This corresponds to selection of the output image from the candidate image generation unit 102 in FIG. 1A.

Simultaneously, next field determination processing is performed. The output from the determination processing indicates "combination with the preceding field image", "combination with the succeeding field image", or "neither".

More specifically, the result is selected from "the field image B2 is paired with the field image B1", "the field image B2 is paired with a field image M1", and "the field image B2 is paired with neither field image". Co1>Coe>Co2 in the processing shown in FIGS. 3 and 4. Hence, the field image B2 and M1 are determined as discontinuous fields. The pattern log up to this time is reset, and the pattern is unlocked.

Processing to be executed when the current field image is the field image M1 will be described next. Since the detection pattern is not locked (pattern is not detected), intra-field interpolation processing is performed. This corresponds to selection of the output image from the candidate image generation unit 104 in FIG. 1A.

Simultaneously, next field determination processing is performed. The output from the determination processing branches to three cases: "combination with the preceding field image", "combination with the succeeding field image", and "neither".

More specifically, the result is selected from "the field image M1 is paired with the field image B2", "the field image M1 is paired with a field image M2", and "the field image M1 is paired with neither field image". Co2>Co1>Coe in the processing shown in FIGS. 3 and 4. Hence, the field images M1 and M2 are determined as continuous fields. The field image M1 is the preceding field image for the next field image M2. Hence, the pattern "1" is newly updated. Since the past pattern log has been reset, no specific pattern is detected, and the pattern remains unlocked.

Processing to be executed when the current field image is the field image M2 will be described next. Since the detection pattern is not locked (pattern is not detected), intra-field interpolation processing is performed. This corresponds to selection of the output image from the candidate image generation unit 104 in FIG. 1A.

Simultaneously, next field determination processing is performed. The output from the determination processing branches to three cases: "combination with the preceding field image", "combination with the succeeding field image", and "neither".

More specifically, the result is selected from "the field image M2 is paired with the field image M1", "the field image M2 is paired with a field image N1", and "the field image M2 is paired with neither field image". Co1>Co2>Coe in the processing shown in FIGS. 3 and 4. Hence, the field images M2 and N1 are determined as continuous fields. The next field image N1 is not paired with the preceding field image M2. The field image N1 is supposed to be paired with the succeeding field image. Hence, the pattern "2" is newly updated. Since the determination result after the pattern log reset is only "1", no specific pattern is detected, and the pattern remains unlocked.

Subsequently, when the current field image is the field image N1, the pattern log is 1-2. The pattern log is 1-2-1 for a field image N2. The pattern log is 1-2-1-1 for a field image N3. The pattern log is 1-2-1-1-2 for a field image O1. The pattern is locked here.

Figure 5A:
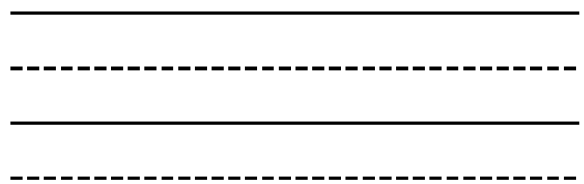
FIGS. 5A to 5C are views for explaining intra-field interpolation processing according to the first embodiment of the present invention.
Figure 5B:
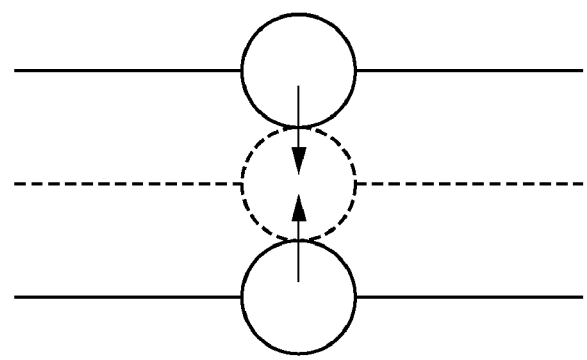
Figure 5C:
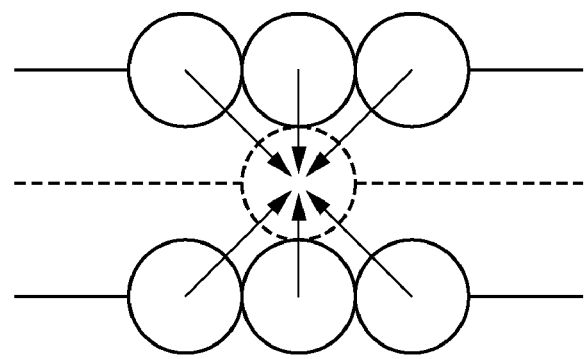

The intra-field interpolation processing performed at this time interpolates lines skipped in the interlaced image. The solid lines in FIG. 5A represent lines with pixels, and the broken lines represent lines without pixels. Most simply, interpolation can be done based on pixels on the upper and lower sides of the interpolation target, as shown in FIG. 5B. Alternatively, interpolation may be performed based on pixels around the target pixel, as shown in FIG. 5C. Interpolation may be done by weighting each pixel in accordance with the feature amount of the image.

Figure 9F:
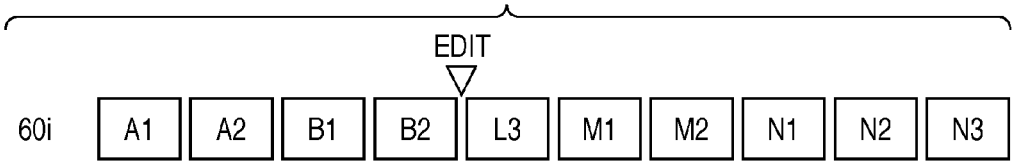

An example of editing shown in FIG. 9F will be described next. In this example as well, an editing point exists after the field image B2. Processing up to the field image B2 is the same as described above.

Processing to be executed when the current field image is a field image L3 will be described. Since the detection pattern is not locked (pattern is not detected), intra-field interpolation processing is performed. This corresponds to selection of the output image from the candidate image generation unit 104 in FIG. 1A.

Simultaneously, next field determination processing is performed. The output from the determination processing branches to three cases: "combination with the preceding field image", "combination with the succeeding field image", and "neither".

More specifically, the result is selected from "the field image L3 is paired with the field image B2", "the field image L3 is paired with the field image M1", and "the field image L3 is paired with neither field image". Coe>Co2>Co1 in the processing shown in FIGS. 3 and 4. Hence, the field images L3 and M1 are determined as discontinuous fields. Hence, the pattern is not updated. Since the past pattern log has been reset, no specific pattern is detected, and the pattern remains unlocked.

Processing to be executed when the current field image is the field image M1 will be described next. Since the detection pattern is not locked (pattern is not detected), intra-field interpolation processing is performed. This corresponds to selection of the output image from the candidate image generation unit 104 in FIG. 1A.

Simultaneously, next field determination processing is performed. The output from the determination processing branches to three cases: "combination with the preceding field image", "combination with the succeeding field image", and "neither".

More specifically, the result is selected from "the field image M1 is paired with the field image L3", "the field image M1 is paired with the field image M2", and "the field image M1 is paired with neither field image". Co2>Co1>Coe in the processing shown in FIGS. 3 and 4. Hence, the field images M1 and M2 are determined as continuous fields. The field image M1 is the preceding field image for the next field image M2. Hence, the pattern "1" is newly updated. Since the past pattern log has been reset, no specific pattern is detected, and the pattern remains unlocked.

Subsequently, when the current field image is the field image M2, the pattern log is 1. The pattern log is 1-2 for the field image N1. The pattern log is 1-2-1 for the field image N2. The pattern log is 1-2-1-1 for the field image N3. The pattern log is 1-2-1-1-2 for the field image O1. The pattern is locked here.

As described above, according to the first embodiment, the correlation between the current field image and each of the preceding and succeeding field images is detected. A field image combination for the next field image to generate a frame image is determined based on the detection result, thereby generating a frame image. Alternatively, a frame image is generated by intra-field interpolation processing.

This makes it possible to prevent generation of a frame image degraded due to a change of the time axis and maintains stable image quality even when the periodicity of the field image sequence is disordered.

Second Embodiment

Figure 6:
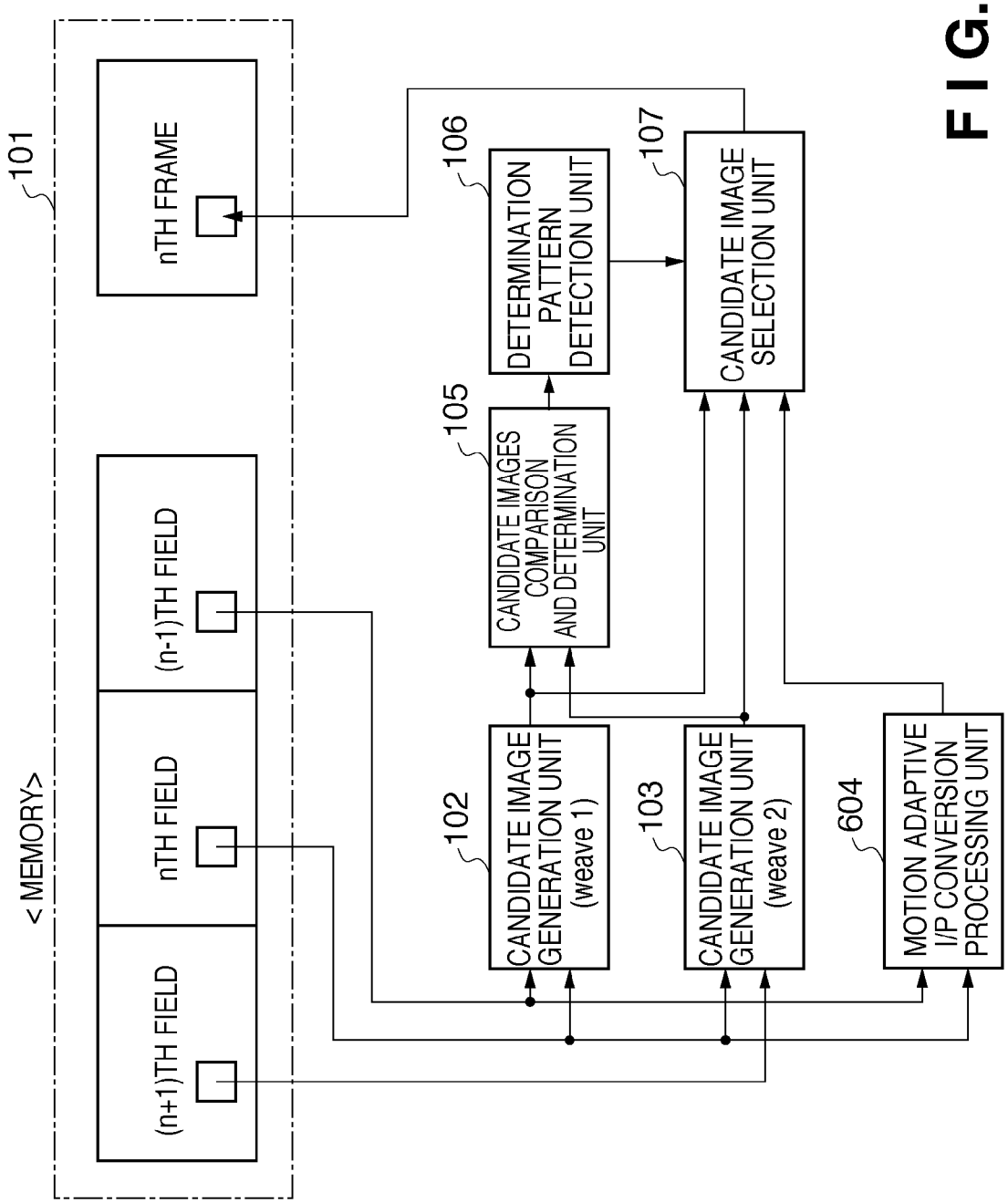
FIG. 6 is a block diagram showing the functional arrangement of a moving image processing apparatus according to the second embodiment of the present invention.

A moving image processing apparatus according to the second embodiment includes a motion adaptive I/P conversion processing unit 604 in place of the third candidate image generation unit 104 in FIG. 1A of the first embodiment, as shown in FIG. 6. I/P conversion is to convert a field image that is an interlaced image (I image) into a frame image that is a progressive image (P image). Especially, the motion adaptive I/P conversion processing unit 604 generates one frame from two field images, i.e., a current field image and a preceding field image.

Detailed processing of the moving image processing apparatus according to the second embodiment will be described next with reference to FIG. 7.

FIG. 7 is a flowchart illustrating processing to be executed by the moving image processing apparatus according to the second embodiment of the present invention.

Unlike the flowchart in FIG. 2 of the first embodiment, if the detection pattern is not locked, the motion adaptive I/P conversion processing unit 604 executes motion adaptive I/P conversion processing (step S704). Next field determination processing is the same as in FIGS. 3 and 4 of the first embodiment.

A detailed processing procedure will be described using an example of edition shown in FIG. 9E, as in the first embodiment. Processing up to a field image B2 is the same as described above because the detection pattern is locked.

Processing to be executed when the current field image is a field image M1 will be described. Since the detection pattern is not locked (pattern is not detected), motion adaptive I/P conversion processing is performed. This corresponds to selection of the output image from the motion adaptive I/P conversion processing unit 604 in FIG. 6.

An outline of motion adaptive I/P conversion processing will be explained with reference to FIGS. 8A to 8D.

Figure 8A:
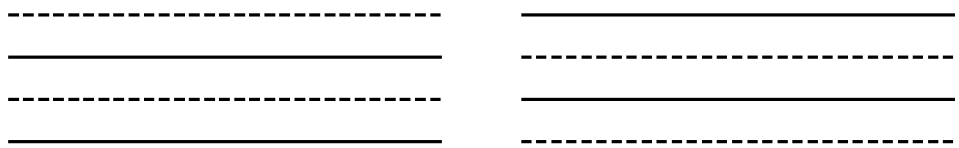
FIGS. 8A to 8D are views for explaining I/P conversion processing according to the second embodiment of the present invention.

FIG. 8A shows the relationship between the lines of a current field image and those of a preceding field image. The solid lines represent lines with pixels, and the broken lines represent lines without pixels. In motion adaptive I/P conversion processing, the processing is adaptively switched by determining whether an interpolation target pixel is moving between fields.

Figure 8B:
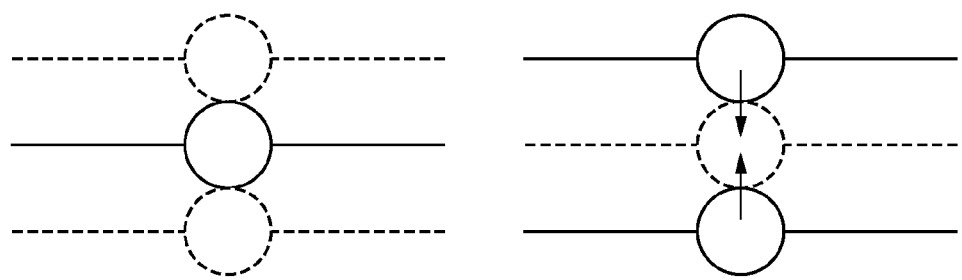

FIG. 8B shows an interpolation example when it is determined that the target pixel is moving between the fields. If the target pixel moves between the fields, the corresponding pixel in the preceding field image moves to another position. Hence, an interpolated pixel is generated only in the current field image.

Figure 8C:
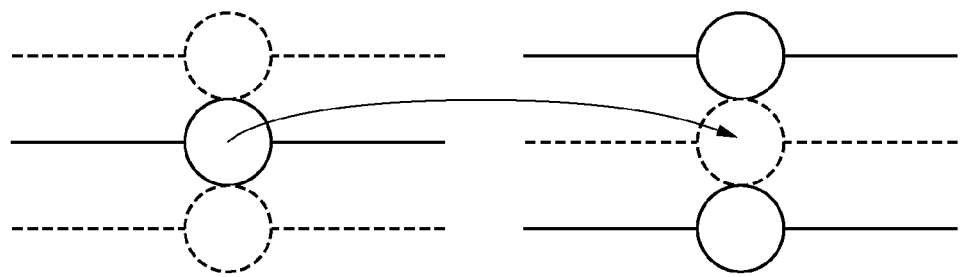

FIG. 8C shows an interpolation example when it is determined that the target pixel rests between the fields. At this time, the target pixel in the preceding field image is directly inserted, thereby improving the resolution in the vertical direction.

Figure 8D:
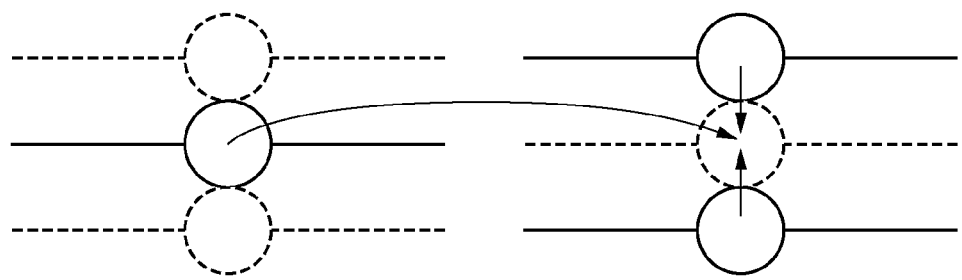

In FIG. 8D, an interpolated pixel is generated not based on one of the two states, i.e., moving state and resting state but by weighting between them.

If the current field image is the field image M1, the preceding field image is B2. They are discontinuous fields. For this reason, no corresponding pixel can be found between the fields, and as a result, the interpolation method in FIG. 8B is employed.

Detection of the discontinuous fields may positively be used. In this case, it is effective to forcibly fix the motion detection to "motion". An obtained interpolated frame is the same as in the intra-field interpolation processing described in the first embodiment.

Simultaneously, next field determination processing is performed. The same processing as in the first embodiment is performed. The field images M1 and M2 are determined as continuous fields. The field image M1 is the preceding field image for the next field image M2. Hence, the pattern "1" is newly updated. Since the past pattern log has been reset, no specific pattern is detected, and the pattern remains unlocked.

Processing to be executed when the current field image is the field image M2 will be described next. Since the detection pattern is not locked (pattern is not detected), motion adaptive I/P conversion processing is performed. This corresponds to selection of the output image from the motion adaptive I/P conversion processing unit 604 in FIG. 6.

When the current field image is the field image M2, the preceding field image is the field image M1. This field corresponds to a frame of the same time, and as a result, the interpolation method in FIG. 8C is employed.

The fact that "1" has been updated in the preceding field image may positively be used. In this case, it is effective to forcibly fix the motion detection to "rest". However, since the pattern is not locked, the certainty of the result of "1" is expected to be slightly low. Hence, the interpolation method in FIG. 8D which changes (increases) the weight for "rest" may be employed.

Simultaneously, next field determination processing is performed. The field images M2 and N1 are determined as continuous fields. The next field image N1 is not paired with the preceding field image M2. The field image N1 is supposed to be paired with the succeeding field image. Hence, the pattern "2" is newly updated. Since the determination result after the pattern log reset is only "1", no specific pattern is detected, and the pattern remains unlocked.

Subsequently, when the current field image is the field image N1, the pattern log is 1-2. The pattern log is 1-2-1 for a field image N2. The pattern log is 1-2-1-1 for a field image N3. The pattern log is 1-2-1-1-2 for a field image O1. The pattern is locked here.

As described above, according to the second embodiment, interpolation processing for a field to generate a frame is adaptively switched based on the motion of a pixel between fields in addition to the effect described in the first embodiment. This allows to generate a frame image more complying with the characteristic of a field image.

In the second embodiment, one frame is generated from two field images, i.e., a current field image and a preceding field image. However, the present invention is not limited to this. For example, one frame may be generated from two field images, i.e., a current field image and a succeeding field image, or a current field image and a preceding field image in accordance with the situation.

That is, the motion adaptive I/P conversion processing unit 604 serving as a third candidate image generation unit receives at least one of the preceding field image and the succeeding field image as an interpolated pixel generation field image. The motion adaptive I/P conversion processing unit 604 generates, for each pixel, an interpolated pixel using pixels in the current field image and those in the interpolated pixel generation field image in accordance with a designated weight, thereby generating a frame image corresponding to the current field image.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-104029 filed on Apr. 11, 2008, which is hereby incorporated by reference herein in its entirety.

What is claimed is:

1. A moving image processing apparatus for generating a frame image from a field image in a moving image, comprising:
   a first candidate image generation unit adapted to receive a current field image of current time and a preceding field image chronologically immediately before the current field image, generate a frame image by combining the current field image and the preceding field image as data of the same time, and output the frame image as a first candidate image;
   a second candidate image generation unit adapted to receive the current field image of the current time and a succeeding field image chronologically immediately after the current field image, generate a frame image by combining the current field image and the succeeding field image as data of the same time, and output the frame image as a second candidate image;
   a third candidate image generation unit adapted to receive the current field image, generate a frame image by pixel interpolation processing for the current field image, and output the frame image as a third candidate image;
   a determination unit adapted to determine whether the current field image has continuity to the preceding field image or continuity to the succeeding field image, or no continuity with any of the preceding field image and the succeeding field image;
   a storage unit adapted to store, based on a determination result of said determination unit, the determination result of the current field image as log information;
   a detection unit adapted to detect a specific pattern from a pattern of log information of continuous field images before the current field image, the log information being stored in said storage unit; and
   a selection unit adapted to select one of the first candidate image, the second candidate image, and the third candidate image as a frame image of the current field image based on a detection result of said detection unit.

2. The apparatus according to claim 1, wherein
   if said detection unit detects the specific pattern, said selection unit selects one of the first candidate image and the second candidate image as the frame image of the current field image in accordance with the specific pattern, and
   if said detection unit does not detect the specific pattern, said selection unit selects the third candidate image as the frame image of the current field image.

3. The apparatus according to claim 1, wherein said determination unit determines whether the current field image has continuity to the preceding field image or continuity to the succeeding field image, or no continuity with any of the preceding field image and the succeeding field image, based on a magnitude relationship between three values including a correlation value between the preceding field image and the current field image, a correlation value between the current field image and the succeeding field image, and a threshold value.

4. The apparatus according to claim 1, wherein
   if the determination result represents that the current field image has continuity to one of the preceding field image and the succeeding field image, said storage unit stores log information of the determination result and updates the log information stored so far, and
   if the determination result represents that the current field image has no continuity to any of the preceding field image and the succeeding field image, said storage unit resets the log information stored so far.

5. The apparatus according to claim 1, wherein said third candidate image generation unit receives one of the preceding field image and the succeeding field image as an interpolated pixel generation field image, generates, for each pixel, an interpolated pixel using pixels in the current field image and those in the interpolated pixel generation field image in accordance with a designated weight, thereby generating a frame image corresponding to the current field image.

6. The apparatus according to claim 5, wherein said third candidate image generation unit changes the weight in accordance with presence/absence of detection of the specific pattern by said detection unit.

7. The apparatus according to claim 6, wherein if said detection unit does not detects the specific pattern, said third candidate image generation unit increases the weight of use of the pixels in the current field image.

8. A control method of a moving image processing apparatus for generating a frame image from a field image in a moving image, comprising:
- a first candidate image generation step of receiving a current field image of current time and a preceding field image chronologically immediately before the current field image, generating a frame image by combining the current field image and the preceding field image as data of the same time, and outputting the frame image as a first candidate image;
- a second candidate image generation step of receiving the current field image of the current time and a succeeding field image chronologically immediately after the current field image, generating a frame image by combining the current field image and the succeeding field image as data of the same time, and outputting the frame image as a second candidate image;
- a third candidate image generation step of receiving the current field image, generating a frame image by pixel interpolation processing for the current field image, and outputting the frame image as a third candidate image;
- a determination step of determining whether the current field image has continuity to the preceding field image or continuity to the succeeding field image, or no continuity with any of the preceding field image and the succeeding field image;
- a storage step of storing, in a storage medium based on a determination result in the determination step, the determination result of the current field image as log information;
- a detection step of detecting a specific pattern from a pattern of log information of continuous field images before the current field image, the log information being stored in the storage medium; and
- a selection step of selecting one of the first candidate image, the second candidate image, and the third candidate image as a frame image of the current field image based on a detection result in the detection step.

9. A non-transitory computer-readable storage medium storing a program to cause a computer to control a moving image processing apparatus for generating a frame image from a field image in a moving image, the program causing the computer to execute:
- a first candidate image generation step of receiving a current field image of current time and a preceding field image chronologically immediately before the current field image, generating a frame image by combining the current field image and the preceding field image as data of the same time, and outputting the frame image as a first candidate image;
- a second candidate image generation step of receiving the current field image of the current time and a succeeding field image chronologically immediately after the current field image, generating a frame image by combining the current field image and the succeeding field image as data of the same time, and outputting the frame image as a second candidate image;
- a third candidate image generation step of receiving the current field image, generating a frame image by pixel interpolation processing for the current field image, and outputting the frame image as a third candidate image;
- a determination step of determining whether the current field image has continuity to the preceding field image or continuity to the succeeding field image, or no continuity with any of the preceding field image and the succeeding field image;
- a storage step of storing, in a storage medium based on a determination result in the determination step, the determination result of the current field image as log information;
- a detection step of detecting a specific pattern from a pattern of log information of continuous field images before the current field image, the log information being stored in the storage medium; and
- a selection step of selecting one of the first candidate image, the second candidate image, and the third candidate image as a frame image of the current field image based on a detection result in the detection step.

* * * * *